US005206075A

United States Patent [19]

Hodgson, Jr.

[11] Patent Number: 5,206,075
[45] Date of Patent: Apr. 27, 1993

[54] SEALABLE POLYOLEFIN FILMS CONTAINING VERY LOW DENSITY ETHYLENE COPOLYMERS

[75] Inventor: William J. Hodgson, Jr., Baytown, Tex.

[73] Assignee: Exxon Chemical Patents Inc., Linden, N.J.

[21] Appl. No.: 810,473

[22] Filed: Dec. 19, 1991

[51] Int. Cl.$^5$ .............................................. B32B 7/02
[52] U.S. Cl. .................................. 428/216; 428/349; 428/516; 428/500; 525/240
[58] Field of Search ............... 428/516, 349, 500, 216; 525/240

[56] References Cited

U.S. PATENT DOCUMENTS

| | | | |
|---|---|---|---|
| 4,291,092 | 9/1981 | Weiner | 428/349 |
| 4,643,945 | 2/1987 | Kiang | 428/349 |
| 4,764,404 | 8/1988 | Genske et al. | 428/35 |

FOREIGN PATENT DOCUMENTS

| | | |
|---|---|---|
| 0221726 | 5/1987 | European Pat. Off. . |
| 0247897 | 12/1987 | European Pat. Off. . |
| 0341091 | 11/1989 | European Pat. Off. . |

Primary Examiner—Edith Buffalow
Attorney, Agent, or Firm—Jaimes Sher

[57] ABSTRACT

The invention provides laminar polyolefin film materials having a base film layer comprising a blend of an olefin polymer and up to about 30% by weight of at least one very low density copolymer of ethylene and a $C_3$ to $C_{20}$ alpha olefin comonomer copolymerizable with ethylene, said base layer having a heat sealable film layer present on one or both surfaces thereof comprising a very low density copolymer of ethylene and a copolymerizable $C_5$ to $C_{12}$ alpha olefin comonomer. The ethylene copolymer constituents of the film are characterized as having a density in the range of about 0.88 g/cm$^3$ to abut 0.915 g/cm$^3$, a melt index in the range of about 0.5 dg/min to about 7.5 dg/min, a molecular weight distribution ($M_w/M_n$) of about 1.5 to about 3.5 and an essentially single melting point in the range of about 60° C. to about 115° C., measured as a DSC peak $T_m$.

Films of this invention exhibit extremely good hot tack seal strength at temperatures in the range of from about 200° to 290° F. thereby rendering them extremely useful as packaging materials in high speed packaging operations.

15 Claims, No Drawings

SEALABLE POLYOLEFIN FILMS CONTAINING VERY LOW DENSITY ETHYLENE COPOLYMERS

FIELD OF THE INVENTION

This invention relates to laminar polyolefin film materials having a base layer comprising a blend of an olefin polymer and a very low density ethylene/alpha monoolefin copolymer and at least one heat sealable layer present on one or both surfaces of said base layer, said heat sealable layer comprising a very low density copolymer of ethylene and a different alpha monoolefin.

DESCRIPTION OF RELATED ART

Films based on polyolefin polymers and copolymers are widely used in packaging applications which require sealing of the film to itself as the package is formed and/or filled. This sealing may be accomplished using adhesives such as low density polyethylene, ethylene/vinyl acetate copolymers and the like. When heat sealing is used, it is important that the thermoplastic film be readily heat sealable while also maintaining other physical and mechanical properties such as resistance to tearing, tensile strength and processability in high speed packaging equipment.

In form/fill packaging operations, film is generally first processed into a bag, a bottom being formed by squeezing together two films, and subjecting the bottom to a temperature above the seal initiation temperature under pressure to seal the bottom of the bag. The bag is subsequently filled with the goods to be packaged, and the top is then sealed in a similar fashion.

Film heat sealing is generally affected by means of heated flat surfaces, between which film surfaces are forcefully pressed together at a temperature above the seal initiation temperature of the film. When use is made of equipment such as vertical form, fill and seal machines, the bag is filled with the contents to be packaged while the bottom seal is still hot. Cooling the seal would entail too long a waiting time, thus lengthening the cycle time and increasing operating costs. Consequently, the film must be one which enables the formation of a strong seal even as the seal formed is at or near the seal formation temperature, i.e., it must have good hot tack seal strength.

There are several other desirable characteristics of a heat sealable film which enable trouble free performance in form fill and seal applications. First the film should provide strong seals at a low temperature to minimize energy requirements. Additionally, the film should allow for strong seals over a broad temperature range so that the film is more forgiving of heat sealing equipment adjustments and inadequacies. And further, the film should enable the development of seal strength almost immediately (before cooling) so that the seal bears and secures the weight of the wrapped product.

Many commonly used plastic materials which are used in the formation of film products could benefit from an improvement of their heat sealing characteristics. For example, crystalline polyolefin films such as polypropylene films have found extensive use in the field of packaging. Polypropylene films, in both oriented or non-oriented form, are used widely in packaging applications because of their superiority in mechanical properties such as tensile strength, rigidity, surface hardness, and optical properties such as gloss and transparency, and in food hygiene properties such as freedom from toxicity and odor. However, polypropylene and other crystalline polyolefin films typically require heat sealing initiation temperatures upwards of about 120° C. before adequate film seal strengths (at least 200 g/inch, desirably 400 g/inch and higher per specified settings for pressure and dwell time) are obtained. Consequently, there has been considerable development work to find ways that would allow the heat sealing of polypropylene films at lower temperatures and provide good hot tack seal strength. Such approaches have included the use of coatings, blend components and multiple film layers.

For example, EPA 0221726 discloses a film laminate prepared by coextruding a base layer which may be a polyolefin, particularly polypropylene or mixtures of polyolefins, and a heat seal layer which may be a very low density polyethylene (VLDPE) or a blend thereof with another polyolefin. The reference also indicates that scrap film may be recycled which could lead to structures where the base layer would comprise a blend of polypropylene and VLDPE.

The VLDPE is described as having a density of 0.890 to 0.912 g/cc and a melt index of generally 0.8 g/10 minutes or less, and is said to be of low crystallinity and produced in a low pressure process.

EPA 0247897 discloses a film laminate comprising a base layer which may contain polypropylene and at least one heat-sealable film layer which may be based on a very low density copolymer of ethylene and an alpha-monoolefin such as octene-1.

U.S. Pat. No. 4,764,404 discloses a multi layer package film having adhered to one side of a base layer (aluminum, polyamide or vinylidene chloride sheet) a composition comprising a blend of polypropylene (40-70% by weight), a second component which may be a copolymer of ethylene and a different alpha olefin (5-35% by weight) and a third elastomeric olefin polymer or copolymer (10-40% by weight).

The second component may be ethylene-based copolymers available from Mitsui under the designations "TAFMER" A or P.

EPA 0341 091 discloses that certain linear low density ethylene copolymers made in accordance with U.S. Pat. No. 4,612,300 using a Ziegler-Natta magnesium halide supported catalyst have good heat seal properties for packaging applications. These copolymers may contain 7-40 wt % of a $C_5$ to $C_{12}$ alpha olefin and exhibit a density of 0.87 to 0.915.

In addition, U.S. Pat. No. 4,291,092 and divisionals, U.S. Pat. Nos. 4,339,496, 4,340,640 and 4,340,641, all disclose a heat sealable packaging film layer for a polypropylene substrate wherein the film layer comprises a blend of a copolymer of ethylene and a higher olefin and a copolymer of propylene and a higher olefin. U.S. Pat. No. 4,643,945 discloses the use of a linear low density polyethylene in a heat sealable film composition.

The prior art heat sealable films are not without certain deficiencies. A need still exists in the industry for a heat sealable layer having a seal initiation temperature of about 110° C. (225° F.) or lower while the film maintains good elevated temperature hot tack properties, abrasion resistance, blocking resistance, good strength and rigidity, and good film optical properties.

A class of highly active olefin catalysts known as metallocenes is well known especially in the preparation of polyethylene and ethylene copolymers. These catalysts, particularly those based on group IV B transition metals such as zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher as, for example, ultra high molecular weight linear polyethylene. At the same time, the molecular weight distribution of the polymers can be controlled from extremely narrow (as in a polydispersity, $M_w/M_n$ of about 2), to broad (a polydispersity of about 8).

Exemplary of the development of these metallocene catalysts for the polymerization of ethylene is found in U.S. Pat. No. 4,937,299 to Ewen et al., hereby incorporated herein by reference. Among other things, this patent teaches that the structure of the metallocene catalyst includes an alumoxane which is formed when water reacts with trialkyl aluminum with the release of methane, which alumoxane complexes with the metallocene compound to form the catalyst.

There are a number of structural variables in polyolefins which affect the ultimate properties of the polymer. Two of the most important are composition distribution (CD) and molecular weight distribution (MWD). Composition distribution (CD) refers to the distribution of comonomer between copolymer molecules. This feature relates directly to polymer crystallizability, optical properties, toughness and many other important use characteristics. Molecular weight distribution (MWD) plays a significant role in melt processability as well as the level and balance of physical properties achievable. Molecular weight (MW) determines the level of melt viscosity and the ultimately desired physical properties of the polymer. The type and amount of comonomer effects the physical properties and crystallizability of the copolymer. All of these structural features (MW, MWD, CD, comonomer type and amount) are readily controllable through he use of metallocene catalysts as exemplified in U.S. Pat. No. 4,937,299, cited above.

Metallocene catalyst are particularly attractive in making tailored ultrauniform and super random specialty copolymers. For example, if a lower density ethylene copolymer is made with a metallocene catalyst, such as very low density polyethylene (VLDPE), an ultrauniform and super random copolymerization will occur, as contrasted with the polymer produced by copolymerization using a conventional Ziegler catalyst.

SUMMARY OF THE INVENTION

The invention provides laminar polyolefin film materials having a base film layer comprising a blend of an olefin polymer and up to about 30% by weight of at least one very low density copolymer of ethylene and a $C_3$ to $C_{20}$ alpha monoolefin comonomer copolymerizable with ethylene, said base layer having a heat sealable film layer present on one or both surfaces thereof comprising a very low density copolymer of ethylene and a copolymerizable $C_3$ to $C_{20}$ alpha olefin comonomer, said film further characterized in that the ethylene/alpha monoolefin copolymer present in one of said layers is a copolymer of ethylene and a $C_6 C_{10}$ alpha monoolefin which alpha monoolefin differs from the alpha monoolefin present in the ethylene copolymer of the other said layers. The ethylene copolymer constituents of the film are characterized as having a density in the range of about 0.88 g/cm³ to abut 0.915 g/cm³, a melt index in the range of about 0.5 dg/min to about 7.5 dg/min, a molecular weight distribution ($M_w/M_n$) of about 1.5 to about 3.5 and an essentially single melting point in the range of about 60° C. to about 115° C., measured as a DSC peak $T_m$.

Films of this invention exhibit extremely good hot tack seal strength at temperatures in the range of from about 200° to 290° F. thereby rendering them extremely useful as packaging materials in high speed packaging operations.

DETAILED DESCRIPTION OF THE INVENTION

The polyolefin component of the base (or core) material of the film of this invention, is preferably selected from the group consisting of polypropylene, low density polyethylene, linear low density polyethylene, polybutene, random copolymers of propylene with up to about 15 mole % of a $C_2$ or $C_4$ to $C_{12}$ alpha olefin as well as blends of two or more of these materials. The polyolefins which may be used as the major component in the base layer are distinguished from the VLDPE copolymers also contained in the film in that the former generally exhibit a density in excess of about 0.915 g/cm³.

The preferred polyolefin component of the base layer is crystalline polypropylene or random copolymers of propylene and another alpha olefin. Where random propylene copolymers are used as the base layer, the content of propylene is preferably in the range of from about 88 to 99 mole percent, based on total moles, more preferably in the range of about 90 mole percent to about 94 mole percent. The preferred random copolymers consist of propylene copolymerized with about 1 to 10 mole percent of ethylene.

The VLDPEs which may be used as the copolymer component of the base or sealing layers of the film of this invention are ethylene/alpha-monoolefin copolymers wherein the monoolefin can have from 3–20 carbon atoms such as ethylene/butene-1, ethylene/hexene-1, ethylene/octene-1, ethylene/propylene copolymers. These ethylene copolymers with prescribed range of comonomer levels can be prepared by polymerization of the suitable olefins in the presence of supported or unsupported metallocene catalysts systems. The preferred range of comonomer level generally ranges from about 4 to about 15 mole percent.

The low melting polymer ingredient utilized in the base layer and heat seal layer of the film of the present invention has a density in the range of about 0.88 g/cm³ to about 0.915 g/cm³. Preferably the density is in the range of about 0.89 g/cm³ to about 0.91 g/cm³. Densities above about 0.90 g/cm³ are measured using standard accepted procedures. At densities below about 0.90 g/cm³, the samples are additionally conditioned by holding them for 48 hours at ambient temperature (23° C.), prior to density measurement.

The melt index (MI) of the ethylene/alpha-monoolefin copolymers of the present invention is in the range of about 0.5 dg/min to about 7.5 dg/min. Preferably the MI is in the range of about 0.5 dg/min to about 5.0 dg/min, and the most preferred MI is in the range of 1.0 to 2.5 dg/min. MI as measured herein is determined according to ASTM D-1238 (190/2.16). High load MI is determined according to ASTM D-1238 190/21.6). These copolymers also have a narrow molecular weight distribution. The ratio of $M_w/M_n$ is generally in the range of about 1.5 to about 3.5, preferably in the range of about 2.0 to about 3.0.

The ethylene/alpha-monoolefin copolymers should also have an essentially single melting point characteristic with a peak melting point ($T_m$) as determined by Differential Scanning Colorimetry (DSC) in the range of about 60° C. to about 115° C. Preferably the DSC peak $T_m$ is in the range of about 80° C. to about 100° C. "Essentially single melting point" as used herein means that at least about 80% by weight of the material corresponds to a single $T_m$ peak existing in the range of about 60°-115° C., and there is essentially absent from the polymer any substantial fraction of material which corresponds to a $T_m$ peak found at a temperature higher than about 115° C. i.e., "essentially" the bulk material content of the polymer corresponds to a "single" melting point peak in the 60°-115° C. range, and "essentially" no substantial fraction of the material has a peak melting point in excess of about 115° C., as determine by DSC analysis.

DSC measurements are made on a perkin Elmer System 7 Thermal Analysis System. Melting information reported are second melting data i.e. the sample in heated at a programmed rate of 10° C./min to a temperature above its melting range. The sample is then cooled at a programmed rate of 10° C./min to a temperature below its crystallization range. The sample is then reheated (2nd melting) at a programmed rate of 10° C./min.

The presence of higher melting peaks is detrimental to film properties such as haze, and compromises the chances for meaningful reduction in the seal initiation temperature of the final film.

The composition distribution breadth index (CDBI) of such VLDPE copolymers will generally be in the range of about 70 percent or higher. The CDBI is defined as the weight percent of the copolymer molecules having a comonomer content within 50 percent (i.e. ±50%) of the median total molar comonomer content. The CDBI of linear polyethylene, which does not contain a comonomer, is defined to be 100%.

The Composition Distribution Breadth Index (CDBI) is determined via the technique of Temperature Rising Elution Fractionation (TREF). CDBI determination clearly distinguishes the VLDPE copolymers of this invention (narrow composition distribution as assessed by CDBI values generally above 70%) from VLDPEs available commercially today which generally have a broad composition distribution as assessed by CDBI values generally less than 55%. The benefits to the subject invention accrue through the specific use of VLDPEs of narrow composition distribution. The CDBI of a copolymer is readily calculated from data obtained from techniques known in the art, such as, for example, temperature rising elution fractionation as described, for example, Wild et al., *J. Poly. Sci. Poly. Phys. Ed.*, Vol., 20, p. 441 (1982). Unless otherwise indicated, terms such as "comonomer content", "average comonomer content" and the like refer to the bulk comonomer content of the indicated copolymer.

Utilizing a metallocene catalyst, the VLDPE copolymers useful as the low melting polymers of the present invention can be produced in accordance with any suitable polymerization process, including a slurry polymerization, gas phase polymerization, and high pressure polymerization process.

A slurry polymerization process generally uses superatomospehric pressures and temperatures in the range of 40°-100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

Alternatively, the VLDPE copolymer components of the present invention may be formed by gas-phase polymerization. A gas-phase process utilizes superatmospheric pressure and temperatures in the range of about 50°-120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at a temperatures of 50° C.-120° C. Triethylaluminum may be added as needed as a scavenger of water, oxygen, and other impurities. Polymer product can be withdrawn continuously or semicontinuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The VLDPE copolymers of the present invention can also be produced in accordance with a high pressure process by polymerization ethylene in combination with other monomers such as butene-1, hexene-1, octene-1, or 4-methylpentene-1 in the presence of the catalyst system comprising a cyclopentadienyl-transistion metal compound and an alumoxane compound. It is important, in the high-pressure process, that the polymerization temperature be above about 120° C. but below the decomposition temperature of the polymer product and that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

The blend composition of the film base layer contains from about 1 to about 30 percent by weight of the VLDPE copolymer component, more preferably from about 5 to abut 25 percent by weight of VLDPE, each based on the total weight of olefin polymer forming the base film layer.

The VLDPE copolymer which is applied to one or both surfaces of the base film layer to form a heat sealable layer possesses the same physical and chemical characteristics and may be made by the same processes as described above with respect to the VLDPE component of the base layer, except that it differs compositionally from the copolymers contained in the base layer.

It has been found that the excellent results in terms of hot tack seal strength are achieved where the VLDPE component of a first layer which may be the base layer or heat sealable layer is a copolymer of ethylene and a $C_3$ to $C_{20}$ alpha-monoolefin and the VLDPE component of the other layer is a copolymer of ethylene and a $C_6$ to $C_{10}$ alpha-monoolefin which differs from the alpha-monoolefin comonomer present in the VLDPE of the first layer. In the more preferred embodiments of the invention, the $C_6$ to $C_{10}$ alpha-monoolefin-containing copolymer is used as the heat seal layer and the different $C_3$ to $C_{20}$ alpha-monoolefin-containing copolymer is used as a component in the base layer.

These materials provide an excellent balance of adhesion to the substrate base film without the need to employ an interdisposed anchor or tie layer such as polyvinylidene chloride or ethylene/vinyl acetate copolymers, and also possess the requisite high hot tack seal strength required for modern high speed packaging applications. Best results in terms of adhesion and hot tack seal strength are achieved with laminar structures wherein the VLDPE copolymer component of the base layer is an ethylene/butene-1 copolymer and the heat seal coating layer comprises a copolymer of ethylene with either hexene-1 or octene-1.

The percent hexane extractables for the low melting polymer VLDPE ingredients of the present invention are low enough to allow for applications in the food industry. Preferably, for food packaging applications, products having extractables 5 percent and under would be utilized.

The heat sealable films of the present invention may be manufactured using film fabrication technologies well known in the art. For example, the base film may be extruded into film using a flat die or blown extruded into film using a tubular die, and the heat seal layer formed thereon by solvent deposition, lamination or coextrusion techniques. A preferred method of manufacture is via coextrusion wherein a molten layer of the heat seal material is applied to the surface of an extruded cast film of the base layer. These laminar films may optionally be further oriented (either uniaxially or biaxially) using technologies well known to those skilled in the art.

The laminar film structure of the present invention may have an overall thickness in the range of from about 0.5 mil to about 5 mil, with a preferred thickness of about 0.75 mil to about 2.5 mil. The heat seal coating layer may constitute from about 3 to about 50% of this overall thickness, more preferably from about 10 to 25% of the overall thickness, present on one or both sides of the base layer.

The VLDPE copolymer component of the base layer may also comprise a mixture of compositionally different VLDPE components within the scope of this invention. This is particularly the case because the VLDPE component of the base layer differs compositionally from the VLDPE component of the heat seal layer. Scrap trim recycled to the extruder and mixed with virgin polymer used to make the base layer will result in a base layer which contains a mixture of these VLDPE copolymers. Thus, in a preferred embodiment wherein the heat sealable layer comprises a VLDPE copolymer of ethylene and hexene-1 and the base layer contains a VLDPE copolymer of ethylene and butene-1, recycle of scrap trim back to the extruder would result in a base layer containing a mixture of the ethylene/butene-1 and ethylene/hexene-1 copolymers, along with the major polyolefin component of the base layer.

The polymer components used to fabricate the films of the present invention may also contain appropriate amounts of other additives normally included in such compositions. These include slip agents such as talc, antioxidants, fillers, dyes, pigments, radiation stabilizers and like additives.

The film products made in accordance with the present invention are useful in a wide variety of bag and pouch applications in which heat sealability is important. Bag and pouch forming include, but are not limited to horizontal form-fill-and-seal, and vertical form-fill-and-seal.

Some key properties of the final film are heat sealability and seal strength, hot tack strength, tensile strength, film rigidity, haze and gloss, low extractables, and abrasion resistance.

EXAMPLES

Example I

Preparation of VLDPE-EB-1 (1.6 MI, Density of 0.8895, butene-1 Comonomer)

A catalyst is prepared by adding 5.1 liters of a 10% solution of trimethylaluminum in heptane into a dry and oxygen-free two-gallon reactor equipped with a mechanical stirrer. 800 g of undehydrated silica gel, containing 12.3% water, is slowly added into the reactor. After the addition is complete, the mixture is stirred at ambient temperature for one hour. 20 g of di-(n-butylcyclopentadienyl) zirconium dichloride slurried in 30 liters of heptane is then added into the reactor and the mixture is allowed to react at ambient temperature for 30 minutes. The reactor is then heated to 65° C., while a nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, butene-1 and nitrogen were fed continuously into the reactor to maintain a constant production rate. Product was periodically removed from the reactor to maintain the desired bed weight. The polymerization conditions are shown below.

| Gas Phase Polymerization | |
|---|---|
| Temperature (°F.) | 137 |
| Total Pressure (psia) | 300 |
| Gas Velocity (ft/sec) | 1.58 |
| Catalyst Feed Rate (g/hr) | 7.0 |
| Butene-1 Feed Rate (lb./hr) | 5.3 |
| Production Rate (lb/hr) | 26 |

The polymerized product had a Melt Index (dg/min.) of 1.60 and a Density (g/cm³) of 0.8895.

Example 2

Preparation of VLDPE-EB-2 (2.3 MI, Density of 0.8970, butene-1 comonomer)

The process of Example 1 was repeated as set forth therein except that the polymerization conditions were as shown below:

| Gase Phase Polymerization | |
|---|---|
| Temperature (°F.) | 129 |
| Total Pressure (psia) | 300 |
| Gas Velocity (ft/sec) | 1.59 |
| Catalyst Fed Rate (g/hr) | 7.0 |
| Butene-1 Feed Rate (lb./hr) | 2.9 |
| Production Rate (lb./hr) | 19 |

The polymerized product had a Melt Index (dg/min.) of 2.30 and a Density (g/cm³) of 0.8970.

Example 3

Preparation of VLDPE-EH (15 MI, Density of 0.905, hexene-1 comonomer)

The catalyst for polymerizing this ethylene copolymer was prepared as follows. An 800 gram quantity of silica gel and a 2700 ml. aliquot of methylalumoxane/toluene solution (10%) were placed in a two-gallon reactor and allowed to react at ambient temperature for one hour. A 21.6 gram quantity of di-(n-butylcyclopentadienyl) zirconium dichloride slurried in 300 ml of toluene was added into the reactor and the mixture was allowed to react at 65° C. for 30 minutes. The reactor was then heated at 75° C. while nitrogen gas was purged through the reactor to remove the solvent. The heating and nitrogen purging were stopped when the mixture in the reactor turned into a free-flowing powder.

The polymerization was conducted in a 16-inch diameter fluidized bed gas-phase reactor. ethylene, hexene-1 and nitrogen were fed continuously into the reactor to maintain a constant production rate. Product was periodically removed from the reactor to maintain the desired bed weight. The polymerization conditions are shown below:

| Gas Phase Polymerization | |
|---|---|
| Temperature (°F.) | 158 |
| Total Pressure (psia) | 300 |
| Gas Velocity (ft/sec) | 1.22 |
| Catalyst Feed Rate (g/hr) | 3.0 |
| Hexene-1 Feed Rate (lb./hr) | 3.1 |
| Production Rate (lb./hr) | 20 |

The polymerized product had a measured Melt Index (dg/min) of 1.5 and a density of 0.905 g/cm³.

Examples 4-12

A series of coextruded unoriented films were produced on a compounding extruder to produce AB type laminar films comprising a base film layer having an average thickness of 1.6 mil and a single heat sealable coating layer having an average thickness of 0.4 mils, i.e., the coating layer constituted about 20% of the thickness of the composite film. The composition of the base films was either polypropylene, a propylene/ethylene random copolymer or a mixture of one of the above with a VLPDE copolymer of ethylene and butene-1 as prepared in Examples 1 and 2. The composition of the coating layer was either a VLDPE copolymer of ethylene and butene-1 or a VLDPE copolymer of ethylene and hexene-1 as prepared in accordance with Example 3. The composition of these various layers is identified in Table 1.

As used in Table "PEC" is a crystallizable random copolymer of propylene having a MFI of 5.0 dg/min and containing abut 5 wt % ethylene. It has a DSC peak melting temperature of about 132° C. and is available commercially from Exxon Chemical Company as Excorene ™ PD-9282. PP is a crystallizable polypropylene homopolymer having an MFI of about 2.3 dg/min and is available from Exxon Chemical Company under the designation Exorcene ™ PP4092. The material identified as EB-1 is a VLDPE copolymer of ethylene and butene-1 as prepared in Example 1 having a MFI of 1.60 dg/min and a density of 0.8895 g/cm³. The material designated as EB-2 is a VLDPE prepared in Example 2 with a MFI of 2.30 dg/min and a density of 0.8970 g/cm³. The material designated EH is a VLDPE copolymer of ethylene and hexene-1 as prepared in Example 3 having an MFI of 1.5 dg/min and a density of 0.905 g/cm³.

The material designated EVA is a copolymer of ethylene and vinyl acetate (28% by weight vinyl acetate content) having an MFI of 3.1 dg/min.

Heat seal data and hot tack seal strengths of the various film formulations and configurations were evaluated using a Thellar Model EB Heat Sealer. Under this test, the heat seal sides of the coated films are brought into contact and seals are attempted to be formed at various temperatures from 140° F. to 300° F. in 10°F. increments. The dwell time and pressures applied during sealing generally ranges from about 0.25 to 0.5 seconds and 65-80 psi respectively. The times and pressures employed are indicated in Table 1.

Test results are shown in Table 1. As is evident from the data in Table 1, film compositions within the scope of this invention (Examples 8 and 9) exhibited hot tack strengths in excess of 625 g/in over a sealing temperature of 240° to 270° F. and over 700 g/in at sealing temperatures of 240° F. This is in marked contrast to other formulations outside the scope of the present invention wherein the sealing layer and base layer each contain a VLDPE copolymer of ethylene and butene-1 or a copolymer of ethylene and vinyl acetate.

TABLE 1

| EXAMPLE | BASE FILM COMPOSITION | | VLDPE COATING COMPOSITION | DWELL TIME (SEC) | SEAL PRESSURE (PSI) | SEAL STRENGTH (g/IN) AT °F. | | | | | | | |
|---|---|---|---|---|---|---|---|---|---|---|---|---|---|
| | | | | | | 200° | 210° | 220° | 230° | 240° | 250° | 260° | 270° |
| 4 | 100% PEC | — | EB-1 | 0.5 | 67 | <25 | <25 | 25 | <25 | <25 | <25 | <25 | <25 |
| 5 | 80% PEC | 20% EB-1 | EB-1 | 0.5 | 70 | 25 | 25 | <25 | <25 | <25 | <25 | <25 | <25 |
| 6 | 80% PP | 20% EB-1 | EB-1 | 0.5 | 70 | NS* | NS | <25 | 25 | <25 | <25 | <25 | <25 |
| 7 | 100% PEC | — | EB-2 | 0.5 | 70 | NS | <25 | <25 | <25 | <25 | <25 | <25 | <25 |
| 8 | 100% PP | — | EB-2 | 0.5 | 67 | NS | <25 | 25 | 25 | 75 | 25 | 25 | 25 |
| 9 | 80% PP | 20% EB-1 | EH | 0.25 | 70 | NS | 100 | 425 | >700 | >700 | >700 | >700 | >700 |
| 10 | 80% PP | 20% EB-1 | EH | 0.5 | 76 | 25 | 225 | 375 | 550 | >700 | 625 | 675 | 675 |
| 11 | 100% PEC | — | EVA | 0.5 | 70 | (MAX SEAL STRENGTH AT 160° F.; <25 ABOVE 200° F.) | | | | | | | |
| 12 | 100% PEC | — | EVA | 0.25 | 70 | (MAX SEAL STRENGTH AT 170° F.; <75 ABOVE 200° F.) | | | | | | | |

*NS MEANS NO SEAL

I claim:

1. A multiple layer heat sealable film comprising a base layer and a heat sealable layer superimposed on one or both sides of said base layer;

said base layer comprising a blend of (a) an olefin polymer having a density in excess of 0.915 g/cm$^3$ and (b) from about 1 to about 30 weight percent based on base layer polymer content of a copolymer of ethylene and a $C_3$ to $C_{20}$ alpha monoolefin comonomer, said copolymer having a density of from about 0.88 to about 0.915 g/cm$^3$, a melt index of from about 0.5 to about 7.5 dg/min, a molecular weight distribution of no greater than about 3.5 and a composition distribution breadth index greater than about 70 percent;

said heat sealable layer comprising a copolymer of ethylene and a $C_3$ to $C_{20}$ alpha-monoolefin comonomer, said copolymer having a density of from about 0.88 to about 0.915 g/cm$^3$, a melt index of from about 0.5 to about 7.5 dg/min, a molecular weight distribution of no greater than about 3.5 and a compositional breath index greater than about 70 percent, said film further characterized in that the ethylene/alpha-monoolefin copolymer present in one of said layers is a copolymer of ethylene and a $C_6$ to $C_{10}$ alpha-monoolefin which alpha-monoolefin differs from the alpha-monoolefin comonomer present in the copolymer of the other said layers.

2. The film of claim wherein said copolymer of ethylene and $C_6$ to $C_{10}$ alpha-monoolefin is present in said heat sealable layer.

3. The film of claim 2 wherein said film has a thickness in the range of from about 0.5 to about 5.0 mils.

4. The film of claim 2 wherein said heat sealable layer constitutes about 3 to about 50% of the thickness of said film.

5. The film of claim 2 wherein said ethylene copolymer present in each layer contains from about 4 to about 15 mole percent of said comonomer.

6. The film of claim 2 wherein said heat sealable layer comprises a copolymer of ethylene and hexene-1.

7. The film of claim 6 wherein said base layer comprises a copolymer of ethylene and butene-1.

8. The film of claim 2 wherein the olefin polymer component of said base layer is selected from the group consisting of polypropylene, random copolymers of propylene with up to about 15 mole % of a $C_2$ or $C_4$–$C_{12}$ alpha olefin, low density polyethylene, linear low density polyethylene, high density polyethylene, polybutene and mixtures thereof.

9. The film of claim 8 wherein the olefin polymer component of said base layer is polypropylene.

10. The film of claim 8 wherein the olefin polymer component of said base layer is a crystallizable random copolymer of propylene and ethylene.

11. The film of claim 2 wherein each of said ethylene copolymers present in said base layer and said heat sealable layer are prepared using a metallocene catalyst system.

12. The film of claim 2 wherein said heat sealable layer is superimposed on only one side of said base layer.

13. The film of claim 12 wherein said heat sealable layer comprises about 20% of the thickness of the composite film.

14. A process for fabricating a heat sealed package comprising contacting the surfaces of the heat sealable layers of a film in accordance with claim 1 with one another and under conditions of temperature and pressure sufficient to bond said heat sealable layers together.

15. The process of claim 14 wherein said temperature ranges from about 210° to about 270° F.

* * * * *